US012621823B2

(12) United States Patent
Mourad

(10) Patent No.: US 12,621,823 B2
(45) Date of Patent: May 5, 2026

(54) APPARATUS, METHOD, COMPUTER PROGRAM, ACCESS SYSTEM AND HEAD UNIT FOR A VEHICLE

(71) Applicant: Bayerische Motoren Werke Aktiengesellschaft, Munich (DE)

(72) Inventor: Alaa Mourad, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 519 days.

(21) Appl. No.: 18/006,564

(22) PCT Filed: Feb. 2, 2021

(86) PCT No.: PCT/EP2021/052360
§ 371 (c)(1),
(2) Date: Jan. 23, 2023

(87) PCT Pub. No.: WO2022/042890
PCT Pub. Date: Mar. 3, 2022

(65) Prior Publication Data
US 2023/0276427 A1 Aug. 31, 2023

(30) Foreign Application Priority Data
Aug. 24, 2020 (EP) ..................................... 20192304

(51) Int. Cl.
*H04W 72/12* (2023.01)
*H04B 1/7163* (2011.01)
(Continued)

(52) U.S. Cl.
CPC ....... *H04W 72/1215* (2013.01); *H04B 1/7163* (2013.01); *H04W 84/12* (2013.01); *H04W 88/06* (2013.01)

(58) Field of Classification Search
CPC . H04W 72/1215; H04W 84/12; H04W 88/06; H04B 1/7163
See application file for complete search history.

(56) References Cited

U.S. PATENT DOCUMENTS

2019/0044230 A1* 2/2019 Zaric ......................... H01Q 9/40
2021/0250775 A1* 8/2021 Hardin ................ H04W 52/367

FOREIGN PATENT DOCUMENTS

WO 2020023303 A1 1/2020

OTHER PUBLICATIONS

International Search Report corresponding to International Patent Application No. PCT/EP2021/052360, dated May 17, 2021 (3 pages).

(Continued)

*Primary Examiner* — Mohammad S Anwar
(74) *Attorney, Agent, or Firm* — Maginot, Moore & Beck LLP

(57) ABSTRACT

An apparatus, a method and a computer program are implemented with respect to a vehicle. The vehicle comprises a first communication device for communicating in a wireless local area network and a second communication device for performing Ultra-Wideband (UWB) communication. The apparatus comprises an interface for providing a control signal for controlling the second communication device. The apparatus comprises control circuitry configured to determine information on one or more frequency bands, the information on the one or more frequency bands indicating one or more frequency bands being used or available for the communication of the first communication device. The apparatus is configured to control a channel selection of one or more channels being used for the communication of the
(Continued)

DETERMINING INFORMATION ON ONE OR MORE FREQUENCY BANDS —110

CONTROLLING A CHANNEL SELECTION —120 second communication device based on the information on the one or more frequency bands by providing the control signal.

16 Claims, 3 Drawing Sheets

(51) Int. Cl.
*H04W 84/12* (2009.01)
*H04W 88/06* (2009.01)

(56) References Cited

OTHER PUBLICATIONS

Written Opinion corresponding to International Patent Application No. PCT/EP2021/052360, dated May 17, 2021 (5 pages).
Extended European Search Report corresponding to European Patent Application No. EP20192304, dated Feb. 3, 2021 (7 pages).
Harrington, T. (2018) Project: IEEE P802.15 Working Group for Wireless Personal Area Networks (WPANs), Login. Available at: https://view.officeapps.live.com/op/view.aspx?src=https%3A%2F%2Fmentor.ieee.org%2F802.19%2Fdcn%2F18%2F19-18-0040-00-0000-802-11ax-and-uwb-coexistence.pptx&wdOrigin=BROWSELINK.

* cited by examiner

APPARATUS, METHOD, COMPUTER PROGRAM, ACCESS SYSTEM AND HEAD UNIT FOR A VEHICLE

The present application is the U.S. national phase of PCT Application PCT/EP2021/052360 filed on Feb. 2, 2021, which claims priority of European patent application No. 20192304.2 filed on Aug. 24, 2020, which is incorporated herein by reference in its entirety.

FIELD

Examples relate to an apparatus, a method and a computer program for a vehicle, to an access system or head unit comprising such an apparatus, and to a corresponding vehicle.

BACKGROUND

Ultra-WideBand (UWB) is a wireless system which is used for high accuracy localization. One important application of UWB is in keyless access systems for vehicles. Using UWB, the key fob can be localized using time-of-flight measurements (UWB ranging), which may be used to thwart relay-attacks on keyless go/access systems. UWB has been also integrated in smartphones, which opens the door for smartphones to replace traditional key fobs.

There are also other wireless technologies that are being used in cars, such as Wireless Local Area Networks (WLANs) according to a variant of the Institute of Electrical and Electronics Engineers (IEEE) standard 802.11.

There is some research that deals with the coexistence of the two technologies. For example, "UWB and WLAN Coexistence: a Comparison of Interference Reduction Techniques" by Nikhil Vijay Kaj ale discusses various approaches for analyzing the wireless coexistence between UWB and WLAN. In this work, various WLAN parameters and their influence on UWB are compared.

SUMMARY

There may be a desire for providing an improved concept for UWB and WLAN coexistence.

This desire is addressed by the subject-matter of the independent claims.

Various examples of the present disclosure are based on the finding, that UWB and WLAN both operate in different channels, which may, in some cases, partially overlap. At the same time, not all of the channels are available in all localities, and also various channels may be freely chosen for the operation of WLAN and UWB. Various examples provide an approach, in which the gap between the UWB subsystem of a vehicle (which is often part of an access control system of the vehicle) and the WLAN subsystem of the vehicle (which is often part of the head unit of the vehicle) is bridged, by providing an approach that controls the channel selection of the UWB subsystem based on the WLAN subsystem.

Various examples of the present disclosure provide an apparatus for a vehicle. The vehicle comprises a first communication device for communicating in a wireless local area network (WLAN) and a second communication device for performing Ultra-Wideband (UWB) communication. The apparatus comprises an interface for providing a control signal for controlling the second communication device. The apparatus comprises control circuitry configured to determine information on one or more frequency bands. The information on the one or more frequency bands indicates one or more frequency bands being used or available for the communication of the first communication device. The control circuitry is configured to control a channel selection of one or more channels being used for the communication of the second communication device based on the information on the one or more frequency bands by providing the control signal. By determining the channel selection at the UWB communication device based on the frequency bands being used or available at the WLAN communication device, mutual interference may be avoided, and the wireless coexistence may be improved.

In general, the proposed approach may be used in scenarios where the frequency bands of the WLAN communication device and the channels of the UWB communication device overlap, e.g. in the frequency range upwards of 5.9 GHz. For example, the control circuitry may be configured to, if the information on the one or more frequency bands indicates that the one or more frequency bands include at least one frequency band comprising a frequency that is located between 5.9 GHz and 7.125 GHz, limit the channel selection of the one or more channels being used for the communication of the second communication device.

In various examples, the second communication device is suitable for communicating in a plurality of channels. The control circuitry may be configured to limit the channels being used for the Ultra-Wideband communication to a subset of the plurality of channels based on the information on the one or more frequency bands. By limiting the channel selectin, a communication occurring in two different wireless communication systems (WLAN and UWB) at the same frequencies may be avoided.

As mentioned above, the availability of frequency bands may be limited by location, as each country or region may decide on different frequency ranges being available for certain kinds of communication. Accordingly, the control circuitry may be configured to determine the information on the one or more frequency bands based on a location of the vehicle. The information on the one or more frequency bands may indicate one or more frequency bands being available for the communication of the first communication device at the location.

For example, the control circuitry may be configured to obtain the one or more frequency bands from a data storage based on the location of the vehicle. In other words, the apparatus may look up the available frequency bands based on the location of the vehicle.

Alternatively or additionally, the control circuitry may be configured to determine the information on the one or more frequency bands by determining the frequency band currently being used by the first communication device. In other words, not (only) the theoretical availability of a frequency band for communication may be taken into account (which may provide additional advantages if said frequency bands are merely used by other vehicles), but the actual usage of the frequency band by the vehicle.

The reverse direction may also be considered—if UWB is being used for keyless access/keyless go (i.e. if UWB is being used for ranging), then the frequency bands being used by the WLAN communication device may be adapted. For example, the control circuitry may be configured to determine information on a use of the second communication device for a keyless access or keyless go operation of the vehicle, and to control a frequency band being used by the first communication device if or when the second communication device is used for the keyless access or keyless go operation of the vehicle.

In some examples, the functionality of the apparatus may be integrated within the head unit of the vehicle. Various examples provide a head unit for a vehicle. The vehicle comprises a first communication device for communicating in a wireless local area network and a second communication device for performing Ultra-Wideband communication. The head unit comprises the first communication device and the above apparatus.

Alternatively, the functionality of the apparatus may be integrated within the access system of the vehicle. Various examples provide an access system for a vehicle. The vehicle comprises a first communication device for communicating in a wireless local area network and a second communication device for performing Ultra-Wideband communication. The access system comprises the second communication device and the above apparatus.

Alternatively, the apparatus may be separate from both the head unit and the access system Various examples provide a vehicle comprising a first communication device for communicating in a wireless local area network, a second communication device for performing Ultra-Wideband communication and the above apparatus, the apparatus being separate from the first and from the second communication device.

Various examples provide a corresponding method for a vehicle. The vehicle comprises a first communication device for communicating in a wireless local area network and a second communication device for performing Ultra-Wideband communication. The method comprises determining information on one or more frequency bands. The information on the one or more frequency bands indicates one or more frequency bands being used or available for the communication of the first communication device. The method comprises controlling a channel selection of one or more channels being used for the communication of the second communication device based on the information on the one or more frequency bands by providing a control signal for controlling the second communication device.

Various examples provide a computer program having a program code for performing the above method, when the computer program is executed on a computer, a processor, or a programmable hardware component.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
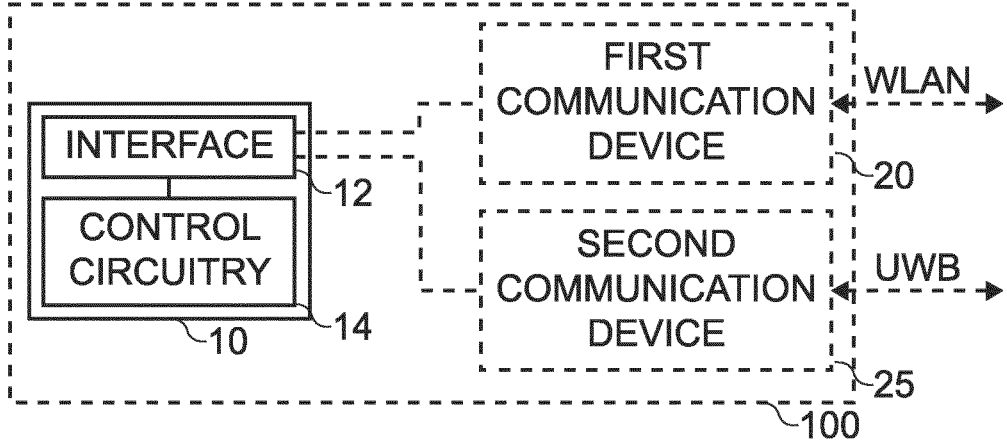
FIG. 1a shows a block diagram of an apparatus for a vehicle.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Various examples of the present disclosure relate to an improvement of wireless coexistence of Ultra-Wideband with WiFi in a vehicle.

In general, UWB uses four radio frequency channels (5-6-8-9) which have a center frequency between 6.5 and 8 GHz. WiFi (WLAN) is also used in the vehicle for different applications (e.g., Internet hotspot). The Federal Communication Commission of the United States decided to open the 6 GHz band for WiFi applications, which means the coexistence of UWB (channels 5-6) and WiFi might not be avoidable in the vehicle.

The four UWB channels may be chosen randomly in different cars in order to reduce channel congestion problem between UWB systems. However if WiFi in the 6 GHz band is active in the same vehicle, an effect on UWB operating in channels 5 and 6 may be observed. For example, WLAN operating in the 6 Ghz band may strongly interfere with UWB and lead to a performance degradation.

The main idea of the proposed concept may be to define an interface between the head unit and the main ECU (that comprises the access system of the vehicle), so that, if WiFi is used in the 6 GHz band, the respective UWB channels (5 and 6) are not chosen by the vehicle. So a coexistence with WiFi may be avoided. The proposed concept may be used in any vehicle that supports both UWB and WiFi applications.

FIG. 1a shows a block diagram of an apparatus 10 for a vehicle 100. The vehicle comprises a first communication device 20 for communicating in a wireless local area network and a second communication device 25 for performing Ultra-Wideband communication. The apparatus comprises an interface 12 for providing a control signal for controlling the second communication device. In general, the interface 12 may be suitable for, or configured to, communication/communicate with at least the second communication device, and optionally also the first communication device. The apparatus comprises control circuitry 14 that is coupled to the interface 12. In general, the functionality of the apparatus may be provided by the control circuitry 14, in conjunction with the interface 12, which may be used to communicate with other entities within the vehicle, such as the first and/or second communication device.

The control circuitry is configured to determine information on one or more frequency bands. The information on the one or more frequency bands indicates one or more frequency bands being used or available for the communication of the first communication device. The control circuitry is configured to control a channel selection of one or more channels being used for the communication of the second communication device based on the information on the one or more frequency bands by providing the control signal (e.g. to the second communication device or to an access system comprising the second communication device).

Figure 2A:
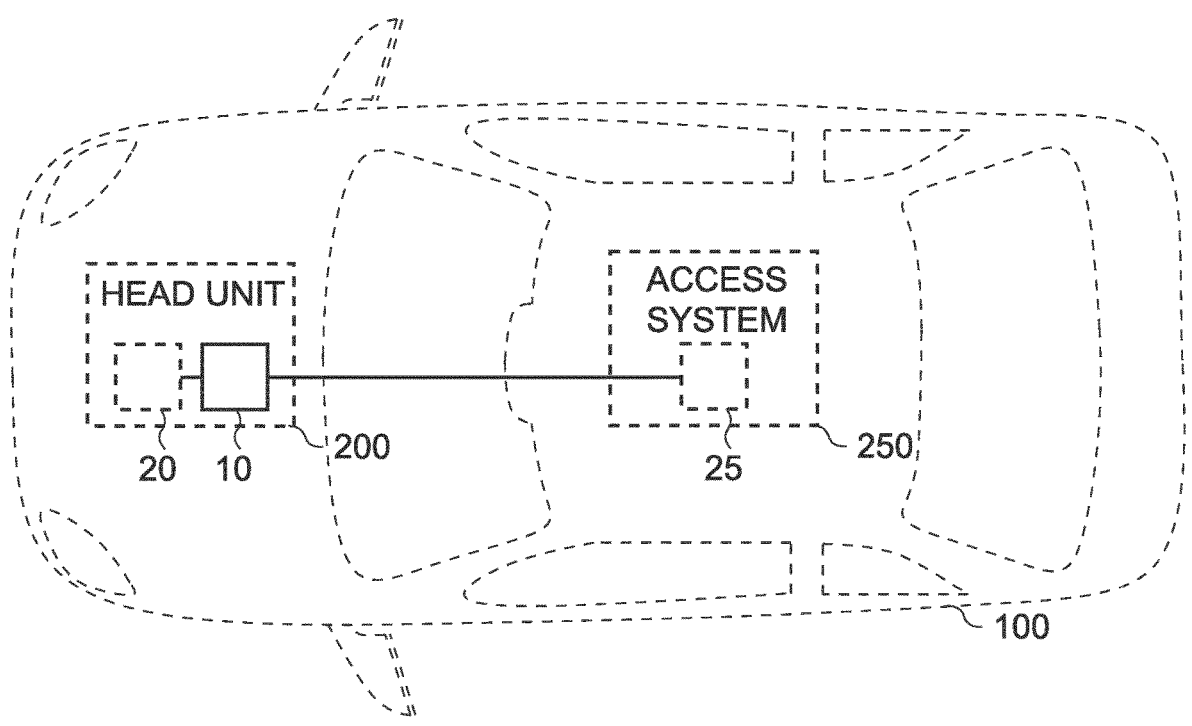
FIG. 2a shows a block diagram of a vehicle with a head unit that comprises the apparatus.
Figure 2B:
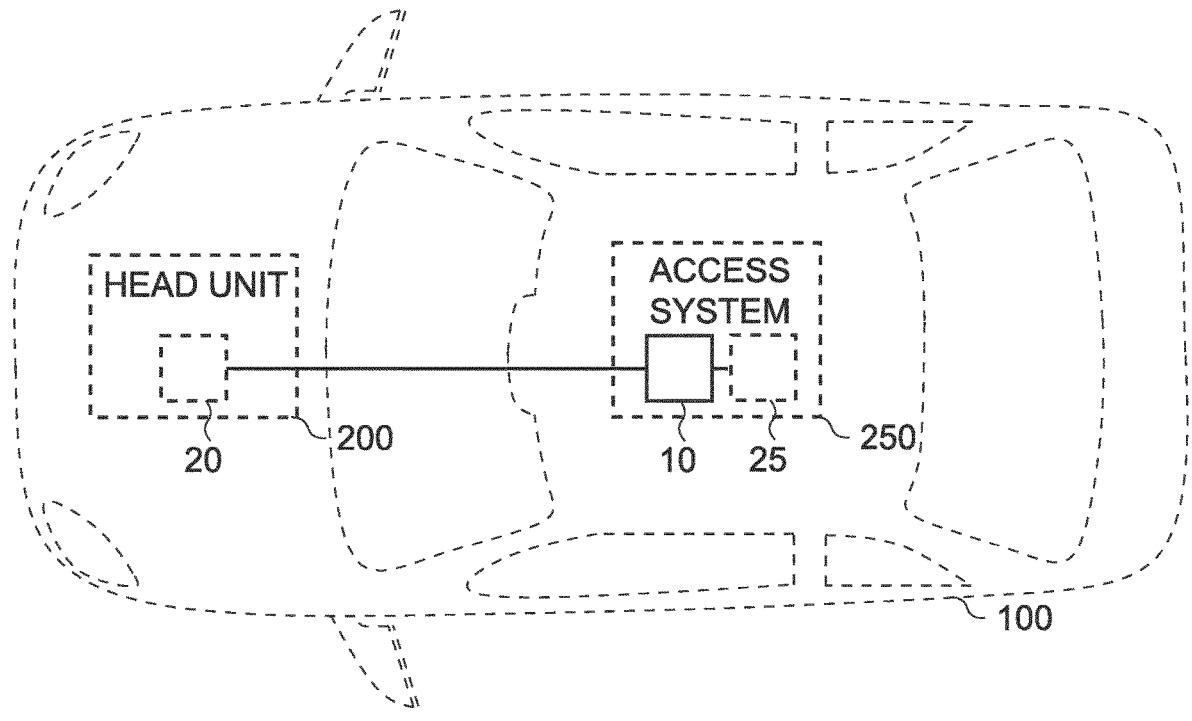
FIG. 2b shows a block diagram of a vehicle with an access system that comprises the apparatus.
Figure 2C:
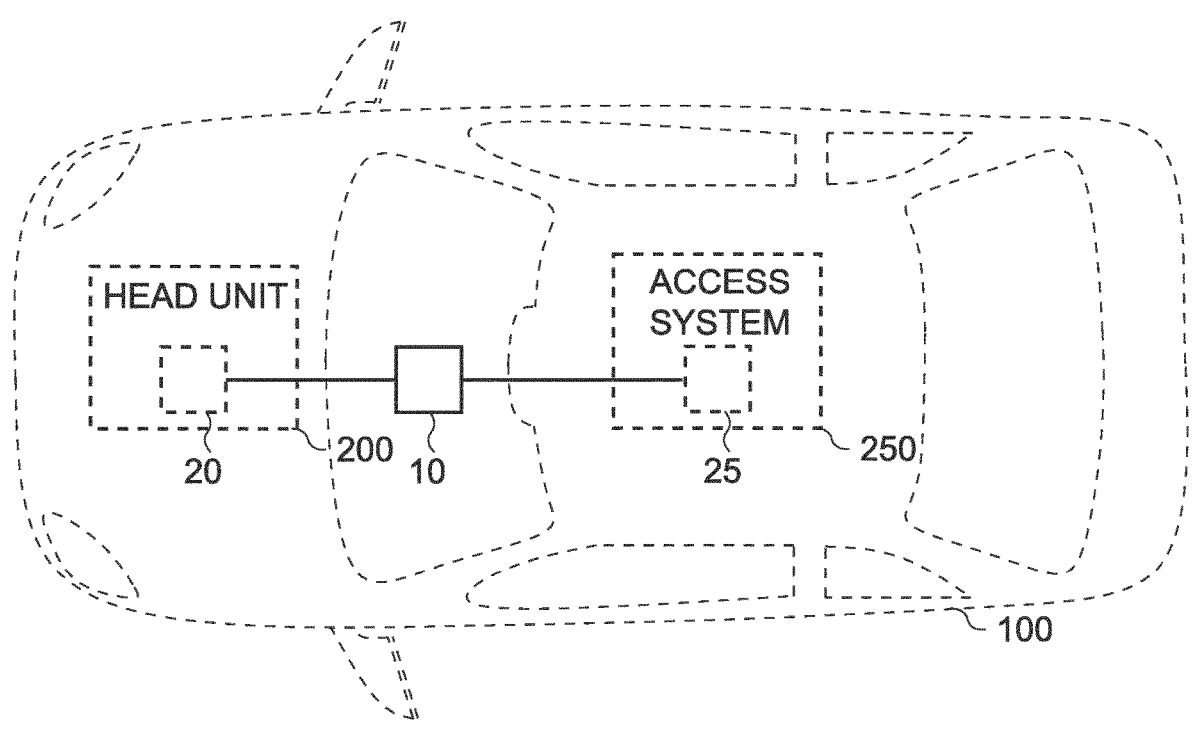
FIG. 2c shows a block diagram of a vehicle comprising an access system, a head unit, and a separate apparatus.

FIG. 1a further shows the vehicle 100 comprising the apparatus 10, the first communication device 20 and the second communication device 25. For example, the first communication device may be part of a head unit 200 of the vehicle (as shown in FIGS. 2a to 2c), and the second communication device may be part of an access system 250 of the vehicle (as further shown in FIGS. 2a to 2c).

Figure 1B:
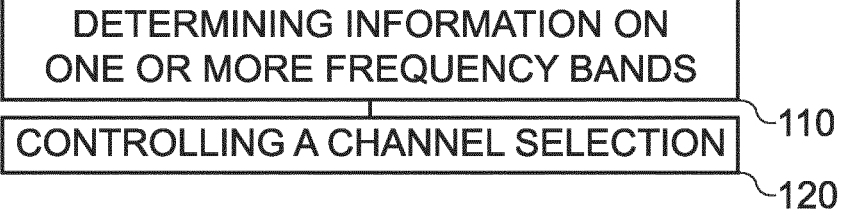
FIG. 1b shows a flow chart of a method for a vehicle.

FIG. 1b shows a flow chart of a corresponding method for the vehicle. The method comprises determining 110 the information on one or more frequency bands. The method comprises controlling 120 the channel selection of the one or more channels being used for the communication of the second communication device based on the information on the one or more frequency bands by providing the control signal for controlling the second communication device (e.g. to the second communication device or to the access system comprising the second communication device).

Various examples of the present disclosure relate to an apparatus, method and computer program for a vehicle, and to a vehicle comprising the same. In this case, the vehicle comprises (at least) two communication devices—one (the first) for communicating in a WLAN, and another for performing UWB communication (the second). Accordingly, the first communication device may also be denoted WLAN communication device, and the second communication device may be denoted UWB communication device. In a vehicle, these two communication devices serve different purposes. The WLAN communication device may be used for providing a local wireless connectivity for mobile devices of passengers of the vehicle. For example, the mobile devices of the passengers may communicate with the head unit of the vehicle via the first communication device. The first communication device may provide a mobile hotspot functionality, or join a mobile hotspot provided by the mobile device of the user (to gain access to the internet). In some examples, the first communication device may also be suitable for Bluetooth communication, i.e. may comprise transceiver circuitry for both WLAN and Bluetooth. In general, the frequency bands of interest for the proposed concept are beyond the frequency bands being used for Bluetooth, but a single chipset may be used for both WLAN (in the 2.4G and 5G+ frequency ranges) and Bluetooth (in the 2.4G frequency range). In the context of the present disclosure, the "head unit" is the central user-facing computer system of the vehicle, which may be used to provide at least one of an entertainment functionality, a navigation functionality and a video mirroring functionality of the vehicle.

The second communication device, on the other hand, serves another purpose. In vehicles, UWB may be used as a security measure in an access system of a vehicle. For example, a key for (or mobile device, such as a smartphone) of a user of the vehicle may be equipped to perform UWB communication. Via a bilateral communication exchange, a UWB time-of-flight measurement (i.e. UWB ranging) may be performed between the second communication device and the key fob/mobile device of the user of the vehicle, in order to determine the location of the key fob/mobile device relative to the vehicle. For example, the second communication device may be used for a keyless access or keyless go functionality of the vehicle, by using the second communication device to determine the location of the key fob/mobile device relative to the vehicle (e.g. to determine whether the key fob/mobile device is located within the vehicle), using UWB signaling.

In some cases, the frequency bands being used by, or available for, the first communication device may interfere with the UWB ranging functionality. In most implementations, UWB is built to use one or more channels in the frequency range between 6 GHz and 9 GHz. In previous implementations of WLAN, on the other hand, the frequencies being used were limited to less than 6 GHz, so that interference between the systems was not an issue. Recently, however, a frequency range between 5.9 GHz and 7.125 GHz has been released for use in WLAN communication, albeit only in a few regions. Depending on the frequency bands used for the WLAN communication, and the channels being used for UWB ranging, interference may occur, which may degrade the precision of the UWB ranging.

The proposed approach attempts to avoid such interference by determining the frequency ranges being used or available for WLAN communication, and adapting the channels being used for UWB accordingly. Various examples of the proposed concept thus provide a logical link between the two separate communication devices, which is used to steer the channel selection of the second communication device based on the frequency bands being used by the first.

Accordingly, the control circuitry is configured to determine the information on the one or more frequency bands. There are various viable implementations. In some implementations, the information on the one or more frequency bands indicates one or more frequency bands (actively) being used for the communication of the first communication device. Accordingly, the control circuitry may be configured to determine the information on the one or more frequency bands by determining the frequency band currently being used by the first communication device. In some implementations, however, the information on the one or more frequency bands indicates one or more frequency bands being available (but not necessarily used) for the communication of the first communication device. This may be done based on a location of the vehicle, as the 6 GHz+ spectrum might only be available in some locations. For example, the control circuitry may be configured to determine the information on the one or more frequency bands based on a location of the vehicle, e.g. using a localization device of the vehicle, such as a localization device for determining the location of the vehicle using a satellite-based global positioning system. In this case, the information on the one or more frequency bands indicates one or more frequency bands being available for the communication of the first communication device at the location. The respective information may be retrieved from a data storage for example, based on the location of the vehicle. In other words, the control circuitry may be configured to obtain the one or more frequency bands from a data storage (of the vehicle or via the internet) based on the location of the vehicle.

Once the frequency band(s) being available/used for the WLAN communication are known, the channel selection of the UWB ranging may be adapted. Accordingly, the control circuitry is configured to control the channel selection of the one or more channels being used for the communication of the second communication device based on the information on the one or more frequency bands by providing the control signal. For example, the control signal may be provided to the second communication device, or to the access system. The control signal may instruct the second communication device to limit the channels being used for UWB ranging. For example, the second communication device may be suitable for communicating in a plurality of channels. The control circuitry is configured to limit the channels being used for the Ultra-Wideband communication to a subset of the plurality of channels based on the information on the one or more frequency bands (by providing the control signal that instructs the second communication device to limit the channel selection).

As has been pointed out before, these measures might only be necessary if the frequency bands being used/available for the WLAN communication overlap with the channels being used for UWB ranging. Accordingly, the control circuitry may be configured to, if the information on the one or more frequency bands indicates that the one or more frequency bands include at least one frequency band comprising a frequency that is located between 5.9 GHz and 7.125 GHz, limit the channel selection of the one or more channels being used for the communication of the second communication device.

On the other hand, not all vehicles that are equipped with UWB may also actively use UWB, e.g. as the mobile device of the user might not support UWB, or as the key fob is equipped with a different radio technology. Accordingly, the usage of UWB might not be assumed as a given, and the active usage of UWB may also be used as a factor in determining the frequency bands to use for the WLAN communication. For example, the control circuitry may be configured to determine information on a use of the second communication device for a keyless access or keyless go operation of the vehicle, e.g. to determine whether UWB ranging is actually being used. The control circuitry may be configured to control a frequency band being used by the first communication device if, or when, the second communication device is used for the keyless access or keyless go operation of the vehicle. In other words, during operation of the second communication device for UWB ranging, the first communication device may be controlled (e.g. via a further control signal) to block the respective frequencies, so they are available for UWB ranging, e.g. using band steering.

The interface 12 may correspond to one or more inputs and/or outputs for receiving and/or transmitting information, which may be in digital (bit) values according to a specified code, within a module, between modules or between modules of different entities. For example, the interface 12 may comprise interface circuitry configured to receive and/or transmit information. For example, the interface 12 may be configured to communicate with the first and/or the second communication device via a vehicular communication network, such as the Controller Area Network Bus (CAN Bus), the Local Interconnect Network (LIN), or Ethernet. Additionally or alternatively, depending on where the apparatus 10 is located, the interface 12 may be configured to directly communicate with the first and/or second communication device.

In various examples, the control circuitry 14 may be implemented using one or more processing units, one or more processing devices, any means for processing, such as a processor, a computer or a programmable hardware component being operable with accordingly adapted software. In other words, the described function of the control circuitry 14 may as well be implemented in software, which is then executed on one or more programmable hardware components. Such hardware components may comprise a general-purpose processor, a Digital Signal Processor (DSP), a micro-controller, etc.

As has been pointed out above, the first communication device may be part of a head unit of the vehicle, and the second communication device may be part of an access system of the vehicle (for providing keyless access/keyless go functionality). The apparatus 10, however, may be co-located with any of the aforementioned entities, or be kept separate, as is shown in FIGS. 2a to 2c.

FIG. 2a shows a block diagram of the vehicle 100 with a head unit 200 that comprises the apparatus 10. The apparatus 10 is coupled to the separate access system 250 with the second communication device 25, in order to provide the control signal for the second communication device.

FIG. 2b shows a block diagram of the vehicle 100 with an access system 250 that comprises the apparatus 10. In this case, the apparatus is co-located with the access system, and may obtain information regarding the usage/availability of the frequency bands by being coupled with the head unit 200 of the vehicle with the first communication device 20.

In FIG. 2c, the apparatus 10 is separate from both the head unit and the access system. FIG. 2c shows a block diagram of a vehicle 100 comprising an access system 250, a head unit 200, and a separate apparatus 10 (that is separate from both the head unit and the access system).

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An apparatus for a vehicle, the vehicle comprising a first communication device for communicating in a wireless local area network and a second communication device for performing Ultra-Wideband communication, the apparatus comprising:

an interface for providing a control signal for controlling the second communication device; and control circuitry configured to:

determine information on one or more frequency bands, the information on the one or more frequency bands indicating one or more frequency bands being used or available for the communication of the first communication device; and control a channel selection of one or more channels being used for the communication of the second communication device based on the information on the one or more frequency bands by providing the control signal; and wherein the control circuitry is configured to determine information on a use of the second communication device for a keyless access or keyless go operation of the vehicle, and to control a frequency band being used by the first communication device if or when the second communication device is used for the keyless access or keyless go operation of the vehicle.

2. The apparatus according to claim 1, wherein the control circuitry is configured to, if the information on the one or more frequency bands indicates that the one or more frequency bands include at least one frequency band comprising a frequency that is located between 5.9 GHZ and 7.125 GHZ, limit the channel selection of the one or more channels being used for the communication of the second communication device.

3. The apparatus according to claim 2, wherein the second communication device is suitable for communicating in a plurality of channels, and wherein the control circuitry is configured to limit the channels being used for the Ultra-Wideband communication to a subset of the plurality of channels based on the information on the one or more frequency bands.

4. The apparatus according to claim 3, wherein the control circuitry is configured to determine the information on the one or more frequency bands based on a location of the vehicle, and wherein the information on the one or more frequency bands indicates one or more frequency bands being available for the communication of the first communication device at the location.

5. The apparatus according to claim 4, wherein the control circuitry is configured to obtain the one or more frequency bands from a data storage based on the location of the vehicle.

6. The apparatus according to claim 5, wherein the data storage is disposed on the vehicle.

7. The apparatus according to claim 1, wherein the second communication device is suitable for communicating in a plurality of channels, and wherein the control circuitry is configured to limit the channels being used for the Ultra-Wideband communication to a subset of the plurality of channels based on the information on the one or more frequency bands.

8. The apparatus according to claim 1, wherein the control circuitry is configured to determine the information on the one or more frequency bands based on a location of the vehicle, and wherein the information on the one or more frequency bands indicates one or more frequency bands being available for the communication of the first communication device at the location.

9. The apparatus according to claim 8, wherein the control circuitry is configured to obtain the one or more frequency bands from a data storage based on the location of the vehicle.

10. A head unit for a vehicle, the vehicle comprising a first communication device for communicating in a wireless local area network and a second communication device for performing Ultra-Wideband communication, the head unit comprising the first communication device and the apparatus according to claim 1.

11. An access system for a vehicle, the vehicle comprising a first communication device for communicating in a wireless local area network and a second communication device for performing Ultra-Wideband communication, the access system comprising the second communication device and the apparatus according to claim 1.

12. A vehicle comprising a first communication device for communicating in a wireless local area network, a second communication device for performing Ultra-Wideband communication, and the apparatus according to claim 1, wherein the apparatus is separate from the first and from the second communication device.

13. A method for a vehicle, the vehicle comprising a first communication device for communicating in a wireless local area network and a second communication device for performing Ultra-Wideband communication, the method comprising:

determining information on one or more frequency bands, the information on the one or more frequency bands indicating one or more frequency bands actively being used or available for the communication of the first communication device;

controlling a channel selection of one or more channels being used for the communication of the second communication device based on the information on the one or more frequency bands by providing a control signal for controlling the second communication device; and determining information on a use of the second communication device for a keyless access or keyless go operation of the vehicle, and controlling a frequency band being used by the first communication device if or when the second communication device is used for the keyless access or keyless go operation of the vehicle.

14. A computer program having program code for performing the method of claim 13, when the computer program is executed on a computer, a processor, or a programmable hardware component.

15. The method according to claim 13, further comprising limit the channel selection of the one or more channels being used for the communication of the second communication device if the information on the one or more frequency bands indicates that the one or more frequency bands include at least one frequency band comprising a frequency that is located between 5.9 GHz and 7.125 GHz.

16. The method according to claim 13, further comprising determining the information on the one or more frequency bands based on a location of the vehicle, and wherein the information on the one or more frequency bands indicates one or more frequency bands being available for the communication of the first communication device at the location.

\* \* \* \* \*